J. GILBERT.
BAKE-PAN.

No. 177,114.　　　　　Patented May 9, 1876.

WITNESSES:　　　　　INVENTOR:
A. W. Almquist　　　　John Gilbert
John Goethals　　　　BY
　　　　　　　　　　ATTORNEYS.

UNITED STATES PATENT OFFICE.

JOHN GILBERT, OF NEWARK, NEW JERSEY.

IMPROVEMENT IN BAKE-PANS.

Specification forming part of Letters Patent No. 177,114, dated May 9, 1876; application filed April 25, 1876.

*To all whom it may concern:*

Figure 1:
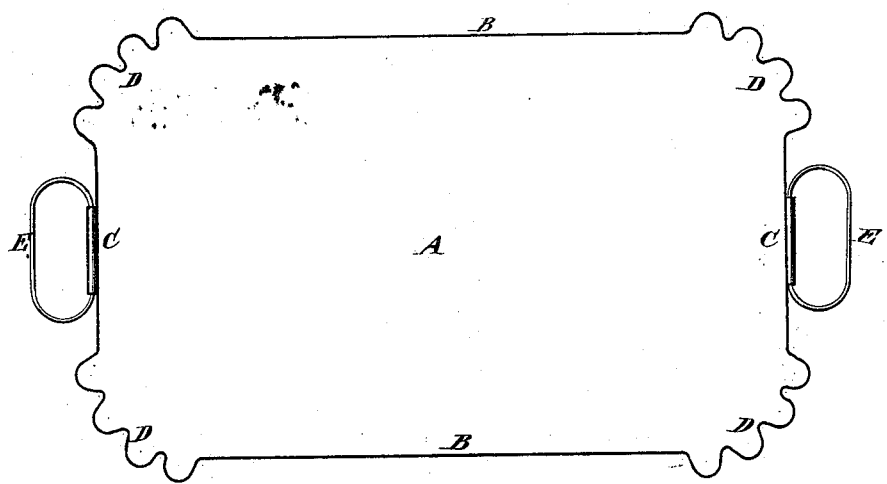
Figure 2:
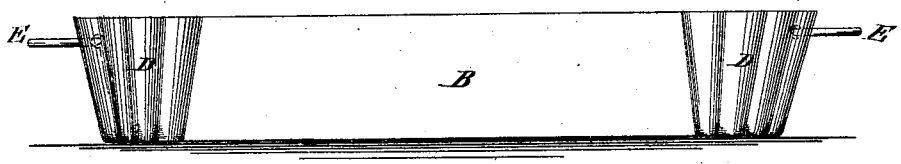

Be it known that I, JOHN GILBERT, of Newark, in the county of Essex, and in the State of New Jersey, have invented a new and Improved Bake-Pan, of which the following is a specification:

Figure 1 is a top view of my improved bake-pan. Fig. 2 is a side view of the same.

The object of this invention is to furnish an improved bake-pan, which shall be so made that it may be struck up out of sheet metal at one operation, and may thus be made more readily and at less expense than when made in the old way.

The invention consists in a pan made with straight sides and ends and scalloped corners, as hereinafter described.

A is the bottom of my improved bake-pan, the sides B and the ends C of which are made straight, and with more or less flare, as may be desired. The corners D are formed with one, two, three, four, or more scallops, to take up the surplus metal, so that the pan can be brought into shape by a single set of dies and at a single operation. This construction also enables the pans to be made of inferior metal, which cannot be done when the metal has to be drawn into shape by a series of operations.

In making my improved pan it is cut out of sheet metal to the proper size, and the corners are rounded off. The plate is then put into the dies, and is brought into shape at a single operation. In this way the corrugations D take up the metal, so that it can be brought at once into shape.

The corrugations also serve as spouts for pouring out gravy or other liquids that may be in the pan.

Ears or handles E may be attached to the ends of the pan in the usual way, if desired.

Having thus described my invention, what I claim as new, and desire to secure by Letters Patent, is—

A pan made with straight sides and ends and scalloped corners, substantially as herein shown and described, to enable the pan to be brought into shape by a single pair of dies and at one operation, as set forth.

JOHN GILBERT.

Witnesses:
JAMES T. GRAHAM,
T. B. MOSHER.